United States Patent Office 3,115,500
Patented Dec. 24, 1963

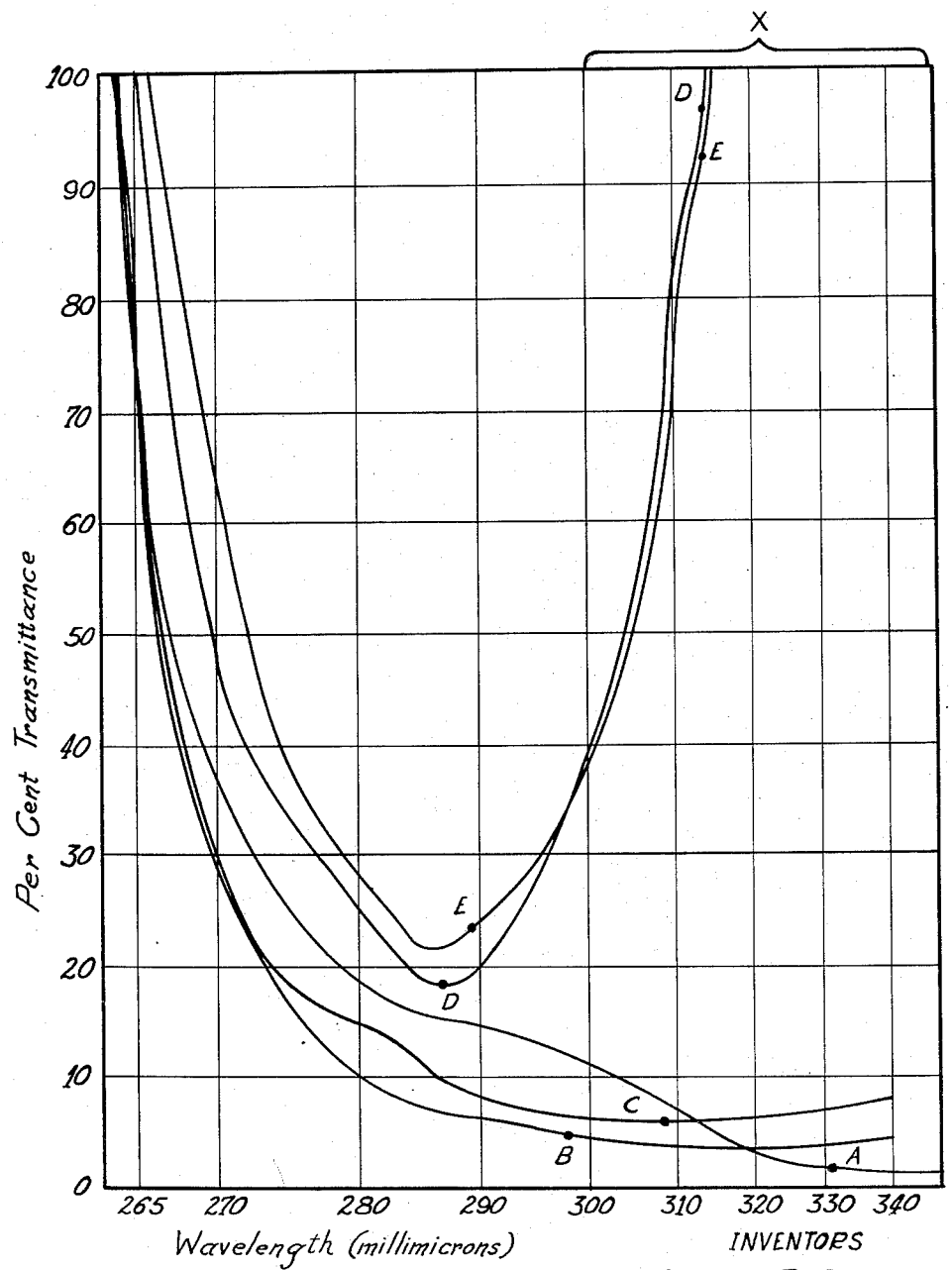

3,115,500
PROCESS FOR PRODUCING PYRROLIDONE
Andrew P. Dunlop, Riverside, Edward Sherman, Chicago, and John W. Madden, East Dundee, Ill., assignors to The Quaker Oats Company, Chicago, Ill., a corporation of New Jersey
Filed Apr. 27, 1961, Ser. No. 106,087
2 Claims. (Cl. 260—326.5)

This invention relates to a process for the production of pyrrolidone and more particularly to a process for the production of pyrrolidone which is suitable for polymerization.

Pyrrolidone is a technologically valuable chemical because it can be polymerized and its polymerization products employed in the manufacture of fibers, fabrics and the like. While several methods have been reported for the production of pyrrolidone, the most widely used method involves amination of gamma-butyrolactone with aqueous or anhydrous ammonia. However, commercially available pyrrolidone which is prepared in this manner usually contains impurities of one type or another which inhibit or otherwise interfere with polymerization of the pyrrolidone or adversely affect the quality of the polymer. It is well recognized in the art that purification of pyrrolidone so as to produce a high-grade product capable of undergoing satisfactory polymerization is particularly difficult and such conventional procedures as fractional distillation do not always remove those impurities which adversely affect polymerization. Some impurities such as water, ammonia, and non-reacted butyrolactone are readily removed from the pyrrolidone or diminished to harmless levels of concentration by efficient fractional distillation. However, other impurities which, for the most part have not been chemically identified, are not amenable to removal from pyrrolidone by ordinary purification techniques and when present even in very low concentration have a detrimental effect on the polymerization qualities of pyrrolidone. Some of these impurities and particularly some of the more detrimental impurities can be detected in the pyrrolidone by such analytical techniques as gas chromatography or by spectral analysis. Nevertheless a number of techniques for treating pyrrolidone to remove impurities therefrom have been suggested in the art. Generally, these prior art procedures for treating pyrrolidone are quite complicated and costly and do not always provide pyrrolidone with the desired polymerization characteristics.

The butyrolactone starting material is produced most economically by hydrogenation of 1,4-butene and 1,4-butane dicarboxylic acids, esters or anhydrides. Thus, for example, in United States Patents Nos. 2,772,291, 2,772,292 and 2,772,293 there are described processes for the production of gamma-butyrolactone by hydrogenation of maleic anhydride. Also, in the copending application, Serial No. 65,599, filed October 28, 1960 by Andrew P. Dunlop, Donald G. Manly and Joseph P. O'Halloran, now Patent Number 3,065,243, November 20, 1962, there is described and claimed an advantageous method for producing butyrolactone which can be employed with great advantage as the starting material in the process of the present invention. In the method described in the copending application, Serial No. 65,599, butyrolactone is produced by hydrogenation of anhydrides or esters of 1,4-butane dicarboxylic acids and 1,4-butene dicarboxylic acids in the presence of a copper chromite catalyst.

Experience has shown that certain of the most objectionable impurities and/or precursors thereof which adversely affect polymerization of pyrrolidone originate in the gamma-butyrolactone starting material and upon amination of the butyrolactone are present in the pyrrolidone product, frequently in such amounts as to make the pyrrolidone unsuitable for use in polymerization reactions. This is a particularly acute problem with butyrolactone which is produced by hydrogenation of the 1,4-butene and 1,4-butane dicarboxylic acids, esters or anhydrides. The need for a simplified process capable of producing from gamma-butyrolactone a polymerizable pyrrolidone which is consistently uniform in quality is thus apparent.

The present invention provides an improved process for the production of a polymerizable-grade pyrrolidone from gamma-butyrolactone. The process of the invention produces pyrrolidone which is readily polymerizable to polypyrrolidone without the necessity of being subjected to further purification prior to use.

It has been found in accordance with the preesnt invention that pyrrolidone which is readily and consistently polymerizable to polypyrrolidone, is produced by amination of gamma-butyrolactone which has been treated with certain salts of gamma-hydroxybutyric acid. Thus, in essence the present invention comprises treating butyrolactone with the gamma-hydroxybutyrate salts prior to amination thereof so as to produce high purity polymerizable pyrrolidone. The process of the invention is particularly advantageous for treating butyrolactone which is produced by hydrogenation of 1,4-butene and 1,4-butane dicarboxylic acids, esters or anhydrides.

Treatment of the gamma-butyrolactone in accordance with the invention is accomplished by distilling the gamma-butyrolactone from the gamma-hydroxybutyrate salts. The pressure and temperature employed in distilling the butyrolactone from the gamma-hydroxybutyrate salts are not particularly important but it is preferred that the distillation be conducted at a temperature ranging from about 65° C. and preferably above about 100° C. to the boiling point of gamma-butyrolactone at atmospheric conditions.

The salts of gamma-hydroxybutyric acid employed in the treatment of butyrolactone in accordance with the present invention are those salts which are stable under the distillation conditions employed and which exhibit an alkaline pH of at least about 8 when 0.1 gram-equivalent thereof is dissolved or suspended in 100 milliliters of neutral water. Representative salts which meet these criteria are the alkali metal salts of gamma-hydroxybutyric acid such as sodium gamma-hydroxybutyrate, potassium gamma-hydroxybutyrate, lithium gamma-hydroxybutyrate; the alkaline earth metal salts such as calcium gamma-hydroxybutyrate, magnesium gamma-hydroxybutyrate, strontium gamma-hydroxybutyrate, barium gamma-hydroxybutyrate and the like.

The gamma-hydroxybutyrate salts employed in the present invention can be obtained from any suitable source and added in the salt form to the gamma-butyrolactone which is to be treated. Moreover, the gamma-hydroxybutyrate salt treating agents can be formed in situ by adding a suitable base to the gamma-butyrolactone which is to be treated and forming the gamma-hydroxybutyrate salts by reaction of the base with a portion of the gamma-butyrolactone. Any base capable of reacting with the gamma-butyrolactone to form gamma-hydroxybutyrate salts which meet the specified criteria is suitable for this purpose. Thus, for example, suitable bases which can be employed to form the gamma-hydroxybutyrate salts in situ by reaction with a portion of the butyrolactone include sodium hydroxide, sodium carbonate, potassium hydroxide, lithium hydroxide, magnesium hydroxide, magnesium oxide, calcium hydroxide, calcium oxide. Of course, when the gamma-hydroxybutyrate salt treating agents are formed in situ by reaction of the base with the portion of the butyrolactone the yield of the treated butyrolactone is correspondingly diminished.

The amount of the gamma-hydroxybutyrate salts to employ in proportion to the butyrolactone which is to be treated is variable over relatively wide limits. In general, the gamma-hydroxybutyrate salts will be employed in the distillation of the butyrolactone in amounts ranging from about 0.01 to 0.10 gram-equivalent per gram mole of butyrolactone. The amount of the gamma-hydroxybutyrate salts to be employed for treating a particular batch of butyrolactone can be experimentally determined by employing several levels of salt concentration in the distillation and then aminating the butyrolactone distillate to produce pyrrolidone. The quality of the pyrrolidone so produced can be readily determined from its vapor-phase chromatogram or its absorption characteristics in ultraviolet or by any other suitable analytical procedure which can be correlated with its quality as a precursor of polypyrrolidone. The use of large excesses of gamma-hydroxybutyrate salts in the treatment of the butyrolactone although uneconomic has no adverse effect.

In accordance with the present invention the butyrolactone which is recovered from the distillation with the base is then aminated to produce high purity polymerizable pyrrolidone. The amination can be accomplished by any conventional procedure known in the art. Generally these conventional procedures involve autoclaving butyrolactone in the presence of ammonia at a temperature in the range from about 180° to 300° C. In one preferred procedure amination of the treated butyrolactone is accomplished by charging a proper amount of the butyrolactone to a pressure reactor such as an autoclave having means for heating it to a temperature within the range of about 230° to 280° C. Liquid or anhydrous ammonia in excess is introduced along with butyrolactone into the pressure reactor and the contents stirred while the temperature is maintained in the specified range. Reaction proceeds smoothly and is complete in a relatively short time which may be from a few minutes to a few hours depending on the temperature employed. When the reaction is substantially complete the material is cooled and any ammonia pressure released. The contents of the pressure reactor are then transferred to suitable distillation apparatus and ammonia and water removed by distillation, with the high purity polymerizable pyrrolidone being distilled under reduced pressure and collected at a temperature of about 142–145° C. at 25 mm. Hg.

The process of the present invention is further illustrated by the following examples which are not to be construed as limitative thereof. Quantities of reactants are in parts by weight unless otherwise indicated.

*Example 1*

Crude butyrolactone was prepared in accordance with the process described in the above-mentioned co-pending application, Serial No. 65,599, as follows:

Copper chromite pellets having the designation "Cu-0203-T1/8" obtained from Harshaw Chemical Company and having a ratio by weight of $CuO:Cr_2O_3$ of 80:20 were reduced according to the following procedure: About 3500 parts of the pellets were charged to a jacketed, steel reactor tube included in a hermetically-joined system comprising a recycle compressor, flowmeter, preheater, reactor tube, condenser and product tank. The entire system was thoroughly flushed with nitrogen to purge it of any oxygen. The system was then pressurized with nitrogen and valves adjusted to obtain a flow of about 1500 parts of the gas per minute with compressor intake discharge pressure of about 4 and 8 pounds per square inch, respectively. The preheater was adjusted to obtain a gas temperature of about 170° C. in the catalyst charge (catalyst bed). Hydrogen was then fed into the circulating nitrogen stream at a rate of about 50 parts per minute. After about 428 parts of water had condensed and collected in the product tank, the system was thoroughly flushed with hydrogen to purge the system of nitrogen. The temperature of the hydrogen gas flowing through the catalyst bed was then gradually raised to about 225° C. over a period of about one hour and held at that temperature for an additional hour. An additional 2.3 parts of water were condensed and collected.

After reduction of the catalyst as described above, 80 parts of maleic anhydride were mixed with 20 parts succinic anhydride. The resulting mixture along with hydrogen gas was fed to a vaporizer over the same reduced catalyst. The feed rate was 0.18, the molar ratio of hydrogen to the two anhydrides was 70:1 and the temperature was 314° C. The product showed a 21.7% theoretical conversion of the maleic anhydride to succinic anhydride and a 78.3% theoretical over-all conversion to gamma-butyrolactone. This product (76,000 parts) was charged into a steam-jacketed vessel and distilled under reduced pressure until 57,000 parts of distillate had collected in the receiver, leaving a residue of succinic anhydride and acid together with some butyrolactone. The wet distillate (approximately 10–15% water) was the crude butyrolactone employed.

To 1000 parts of the crude gamma-butyrolactone produced above were added 25 parts of sodium hydroxide in 40 parts of water, and the mixture was charged to a vessel fitted with a fractionating column, condenser, and receiver. Distillation was then carried out at atmospheric pressure. The initial water fraction was discarded. A small intermediate fraction (boiling point up to 200° C.) and a residual fraction (boiling point above 203° C.) was saved for reworking to recover butyrolactone. The main fraction, boiling from 200–203° C. was then aminated as follows: An aliquot (344 parts) of the main fraction of the gamma-butyrolactone together with about 85 parts of liquid ammonia was charged into an autoclave and agitated by stirring while heating to about 270° C. over a period of about one hour. The stirred mixture was maintained at 270° C. under autogenous pressure for about 20–25 minutes, when it was cooled rapidly and the residual pressure (due to excess ammonia) was released. The autoclave contents were then transferred to a distillation apparatus, and ammonia and water were removed at atmospheric pressure. Subsequent vacuum distillation gave a fraction (308 parts) of 2-pyrrolidone boiling up to about 145° C. at a pressure of 25 mm. of Hg. This major fraction of 2-pyrrolidone was re-distilled and the 2-pyrrolidone (297 parts) boiling in the range 142.5–144° C. at 25 mm. Hg was collected as a final product. This final pyrrolidine product is designated hereinafter and in the accompanying drawings as product A.

*Example 2*

To 1000 parts of crude butyrolactone prepared as in Example 1 were added 33 parts of sodium carbonate and 40 parts of water and the mixture was distilled. The main distillate fraction of the butyrolactone, boiling from 200–203° C. was collected. An aliquot of this main fraction (344 parts) was then aminated and recovered by the same procedure as in Example 1. The resulting pyrrolidone product, boiling in the range 142.5–144° C. at 25 mm. Hg, is designated hereinafter as product B.

*Example 3*

To 1000 parts of crude butyrolactone prepared as in Example 1 were added 23 parts of calcium hydroxide and 40 parts of water and the mixture was distilled. The main distillate fraction of the butyrolactone, boiling from 200–203° C. was collected. An aliquot of this main fraction (344 parts) was then aminated and recovered by the same procedure as in Example 1. The resulting pyrrolidone product, boiling in the range 142.5–144° C. at 25 mm. Hg, is product C.

*Example 4*

To 1000 parts of crude butyrolactone prepared as in Example 1 were added 51 parts of water and the mixture was distilled. No strong base was employed to treat the crude butyrolactone. The main distillate fraction of the butyrolactone, boiling from 200–203° C. was collected. An alliquot (344 parts) of this main fraction was then aminated and recovered by the same procedure as in Example 1. The resulting pyrrolidone product, boiling in the range 142.5–144° C. at 25 mm. Hg, is designated hereinafter as product D.

*Example 5*

To 1000 parts of crude butyrolactone prepared as in Example 1 were added 38 parts of concentrated ammonium hydroxide and 13 parts of water and the mixture was distilled. The main distillate fraction of the butyrolactone boiling from 200–203° C. was collected. An aliquot (344 parts) of this main fraction was then aminated and recovered with the same procedure as in Example 1. The ammonium hydroxide does not react with butyrolactone to form a stable hydroxybutyrate salt. The resulting pyrrolidone product, boiling in the range 142.5–144° C. at 25 mm. Hg, is designated hereinafter as product E.

*Example 6*

To 1000 parts of crude butyrolactone were added 60 parts of sodium hydroxybutyrate. The sodium hydroxybutyrate was prepared by the procedure described by Marvel and Birkhimer in the Journal of the American Chemical Society, 51, 261 (1929). The main distillate fraction of butyrolactone boiling from 200–203° C. was collected. An aliquot (344 parts) of this main fraction was then aminated and recovered by the same procedure as in Example 1. The resulting pyrrolidone product, boiling in the range 142.5–144° C. at 25 mm. Hg, was equivalent in quality to that of Product A as obtained in Example 1.

To determine their suitability for polymerization reactions the pyrrolidone products obtained in Examples 1, 2, 3, 4 and 5 were analyzed by ultraviolet spectrophotometry. For this analysis a Beckman model DK–2 spectrophotometer manufactured by Beckman Instruments, Inc., Fullerton, California, was employed. A pair of matched 1 centimeter quartz absorption cells were filled with distilled water and the instrument was adjusted for the zero and 100% settings. The sample cell was then filled with the pyrrolidone sample and its absorbance measured and automatically recorded in comparison with the water in the reference cell. Operating conditions of the spectrophotometer were as follows:

Scanning time, 2 minutes; wavelength scale expansion selector, 1X; wavelength selector adjusted to start at 340 millimicrons; operation selector, A (absorbance); operating range switch at 0–1; time constant selector, 0.2 second; sensitivity control, 0.12; photomultiplier detector, 1X; hydrogen lamp source.

An absorbance plot for each of the pyrrolidone samples analyzed are shown in the accompanying drawing. The curves A, B, C, D, E are absorbance plots for the pyrrolidone products A, B, C, D and E respectively.

It will be noted from the drawings that pyrrolidone samples D and E exhibit strong absorption in the region designated X indicating the presence of impurities in these pyrrolidone samples. While these impurities have not been chemically identified to our knowledge, experience has shown that the unsatisfactory polymerization characteristics of the pyrrolidone are attributable in large measure thereto. By comparison, the pyrrolidone products A, B and C show little or no absorption in the indicated region, thus indicating the lack of the polymerization inhibitors therein. This analytical data shows clearly the advantages of treating crude butyrolactone with the gamma-hydroxybutyrate salts or with strong bases capable of reacting with butyrolactone to form said salts.

It is apparent from the foregoing that the present invention provides an economical and advantageous method for producing from crude butyrolactone a high quality pyrrolidone which is eminently suitable for polymerization to polypyrrolidone. The pyrrolidone produced in accordance with the present invention need not be subjected to complicated or expensive purification treatments prior to its use in polymerization reactions.

Although we have described a batch process in the specific examples, cyclic or continuous processes can be employed and for maximum economy in operation, the various forecut and residual fractions obtained from distillation of the butyrolactone and pyrrolidone can be recovered and recycled.

Those modifications and equivalents which fall within the spirit of the invention and the scope of the appended claims are to be considered part of the invention.

We claim:

1. In a process for producing pyrrolidone by treating gamma-butyrolactone with ammonia wherein the gamma-butyrolactone is produced by hydrogenation of a member selected from the group consisting of 1,4-butene and 1,4-butane dicarboxylic acids and esters and anhydrides of said acids, the improvement which comprises, prior to treatment with ammonia, forming a stable alkali metal gamma-hydroxybutyrate salt by reaction of a reactable alkali metal base compound with a portion of the gamma-butyrolactone, the said gamma-hydroxybutyrate salt being one which when 0.1 gram-equivalent thereof is placed in 100 milliliters of water provides a pH of at least 8, and then distilling the unreacted gamma-butyrolactone therefrom.

2. In a process for producing pyrrolidone by treating gamma-butyrolactone with ammonia wherein the gamma-butyrolactone is produced by hydrogenation of a member selected from the group consisting of 1,4-butene and 1,4-butane dicarboxylic acids and esters and anhydrides of said acids, the improvement which comprises, prior to treatment with ammonia, forming a stable alkaline earth metal gamma-hydroxybutyrate salt by reaction of a reactable alkaline earth metal base compound with a portion of the gamma-butyrolactone, the said gamma-hydroxybutyrate salt being one which when 0.1 gram-equivalent thereof is placed in 100 milliliters of water provides a pH of at least 8, and then distilling the unreacted gamma-butyrolactone therefrom.

References Cited in the file of this patent

UNITED STATES PATENTS

| | | |
|---|---|---|
| 2,072,861 | Amend et al. | Mar. 9, 1937 |
| 2,772,291 | McShane et al. | Nov. 27, 1956 |
| 2,772,292 | McShane et al. | Nov. 27, 1956 |
| 2,772,293 | Gilbert et al. | Nov. 27, 1956 |
| 2,802,777 | Lohr | Aug. 13, 1957 |